Jan. 29, 1924.
J. G. BLUNT
1,482,183
TRAILING TRUCK FRAME
Filed May 15, 1923
2 Sheets-Sheet 1
- FIG.1 -
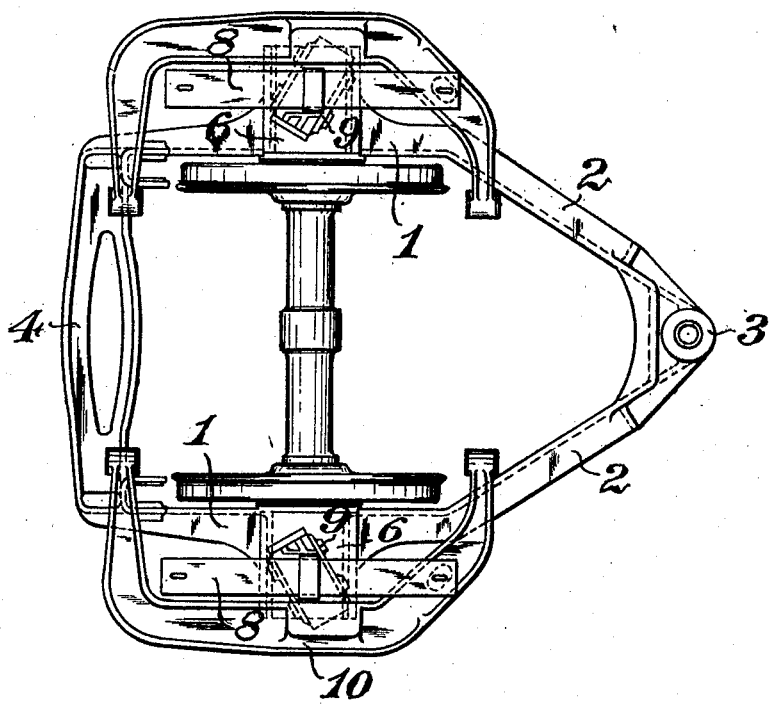
- FIG.2 -
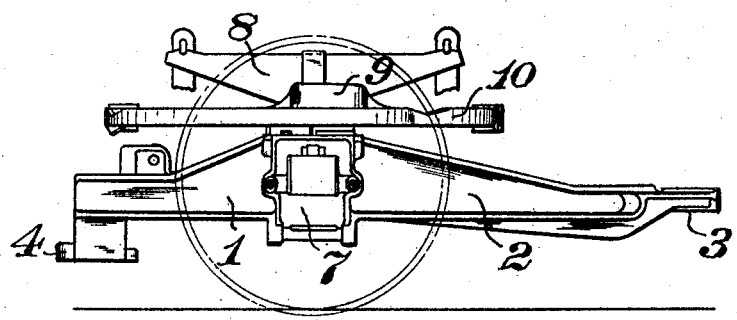

Jan. 29, 1924.
J. G. BLUNT
1,482,183
TRAILING TRUCK FRAME
Filed May 15, 1923  2 Sheets-Sheet 2
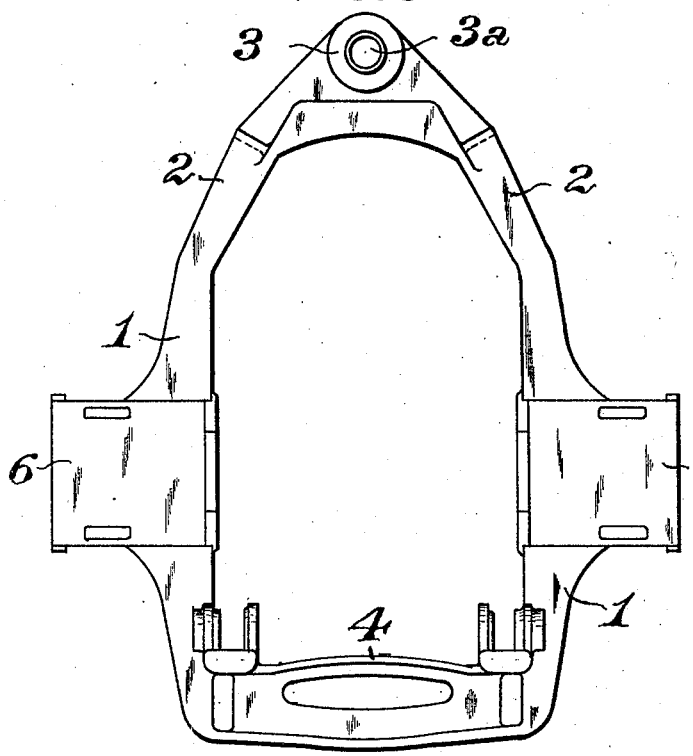
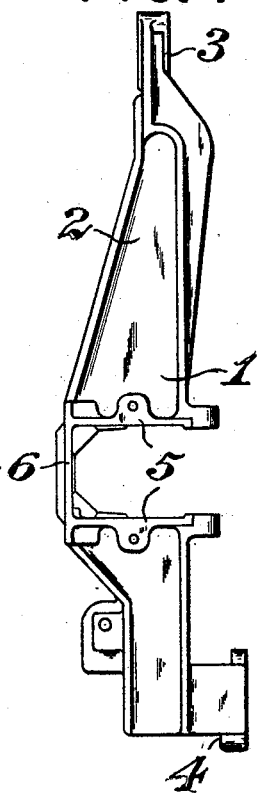
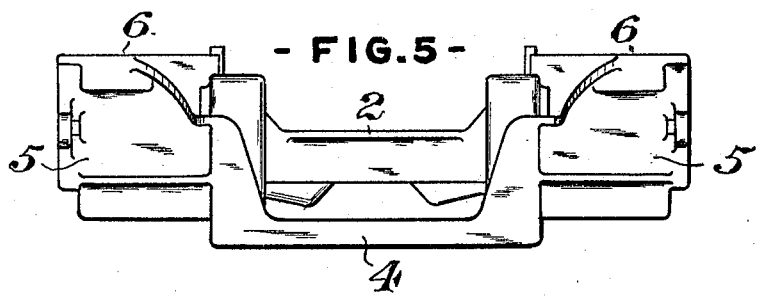

Patented Jan. 29, 1924.

1,482,183

UNITED STATES PATENT OFFICE.

JAMES G. BLUNT, OF SCHENECTADY, NEW YORK.

TRAILING-TRUCK FRAME.

Application filed May 15, 1923. Serial No. 639,047.

*To all whom it may concern:*

Be it known that I, JAMES G. BLUNT, a citizen of the United States, residing at Schenectady, in the county of Schenectady and State of New York, have invented a certain new and useful Improvement in Trailing-Truck Frames, of which improvement the following is a specification.

My invention relates to radial trailing trucks for locomotive engines, and its object is to provide a frame for trucks of such type, which shall be of strong, but comparatively light construction, and be exempt from the structural and operative disadvantages which obtain in truck frames comprising separate members connected by bolts.

The improvement claimed is hereinafter fully set forth.

In the accompanying drawings: Figure 1 is a plan view of a trailing truck embodying my invention; Fig. 2, a side view, in elevation, of the same; Fig. 3, a plan view of the frame, with the accessories detached; Fig. 4, a side view, in elevation, of the same; and, Fig. 5, an end view, as seen from the rear.

In the practice of my invention, referring descriptively to the specific embodiment thereof which is herein exemplified, the truck frame is formed in an integral casting, which comprises two side members, 1, 1; two radius bar arms, 2, 2, which extend forwardly and inwardly from the side members and are joined at their forward ends to a hub or boss, 3, in which is formed a socket, 3ª, for a radius bar pin; a transverse rear member, 4; two journal boxes, 5, each projecting outwardly from one of the side members, and adapted to receive a journal bearing and oil cellar; and horizontal plates or tables, 6, for the reception of spring seats, closing the tops of the journal boxes.

In the assembled truck, the journal boxes, 5, are closed by front plates, 7, and the springs, 8, rest on spring seats, 9, which are, in turn, supported on the journal box plates, 6. Yokes, 10, adapted to be pivotally coupled to the main frame of the locomotive, are connected to the spring seats.

All the members of the truck frame being, as above described, comprehended in an integral casting, proportioned as may be required to afford proper strength and rigidity, the structural costs of machining separate members of a frame where accurate fitting together is necessary, or particularly desirable, and of providing bolt connections are avoided, and in operative service, there is, of course, no liability to accidental detachment of parts of the frame.

I claim as my invention and desire to secure by Letters Patent:

An integral trailing truck frame comprising two side members; two inwardly inclined radius bar arms, extending therefrom to a radius bar pin box; two journal boxes, each extending outwardly from one of the side members; and a transverse member, connecting the rear ends of the side members.

JAMES G. BLUNT.

Witnesses:
J. HOWARD WAGAR,
MADELINE U. UCKER.